April 26, 1932.　　　O. L. FLENER　　　1,855,229
TIRE BUILDING MACHINE
Filed Nov. 9, 1929　　　4 Sheets-Sheet 4
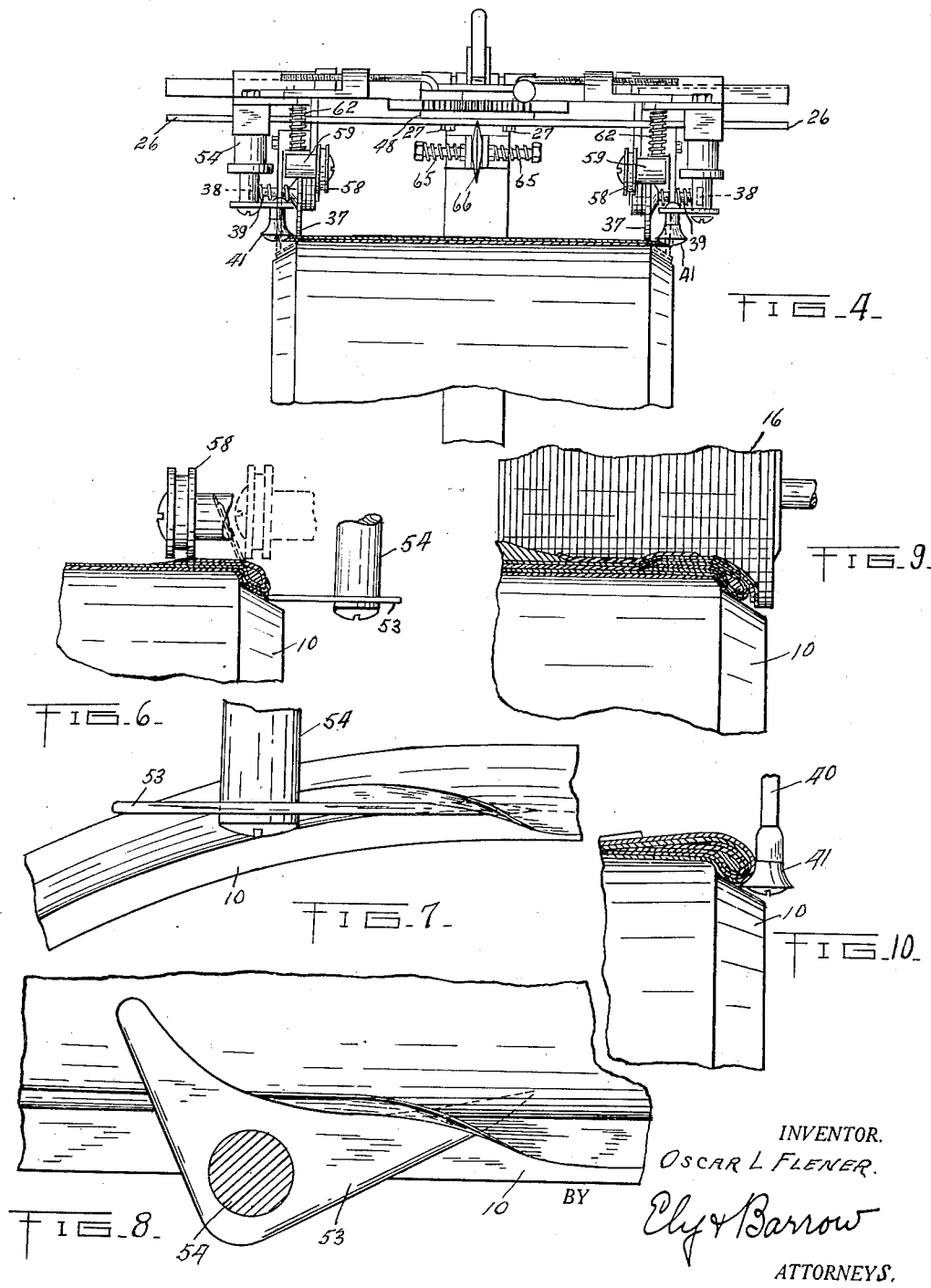
INVENTOR.
OSCAR L FLENER.
BY
Ely & Barrow
ATTORNEYS.

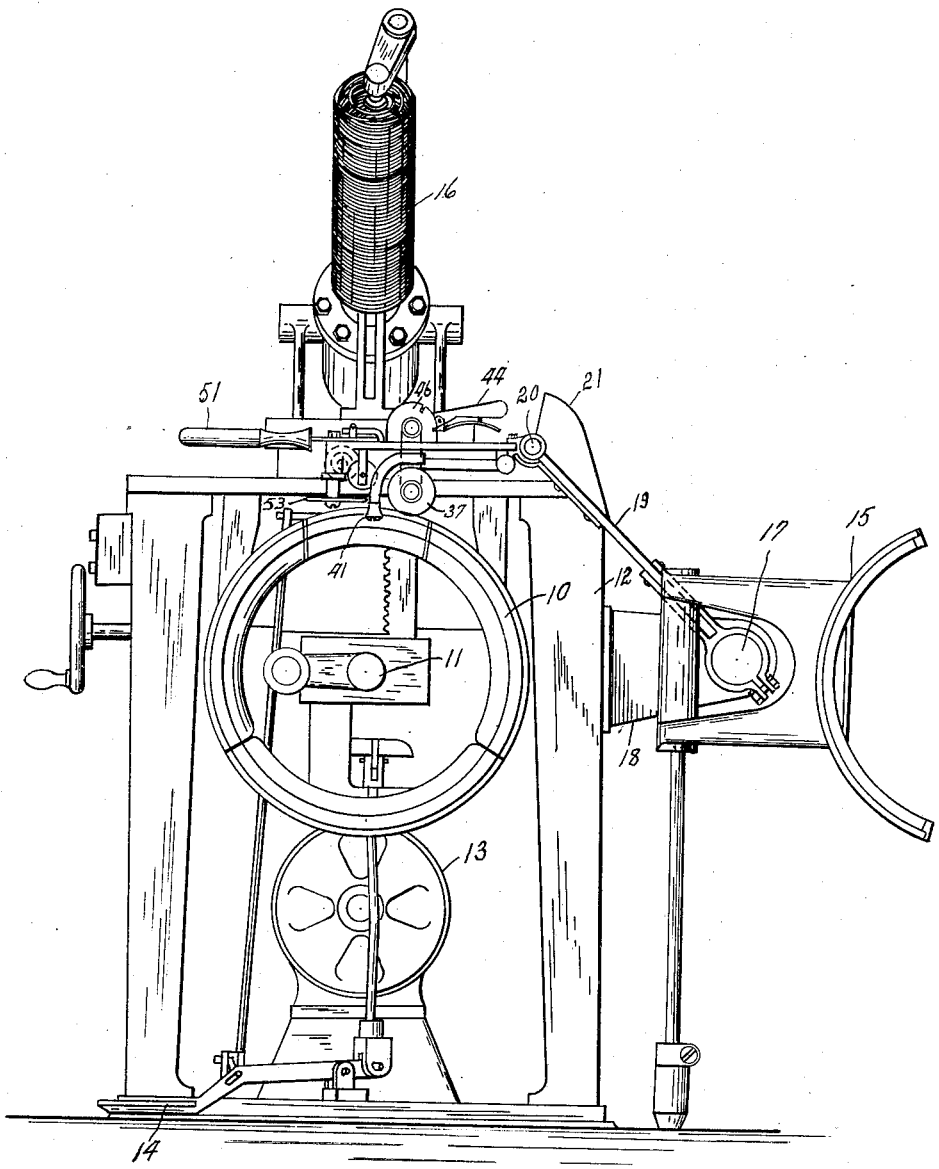

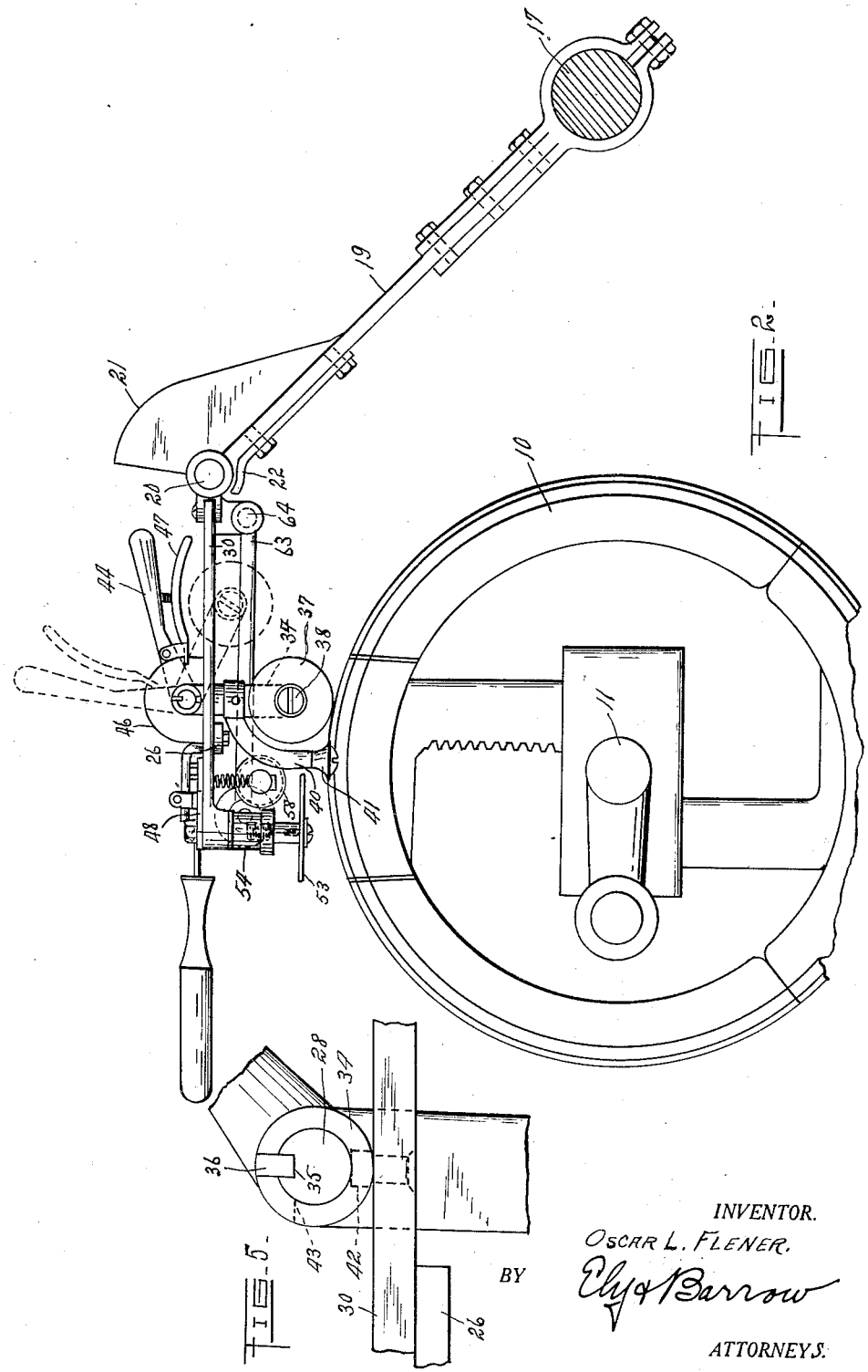

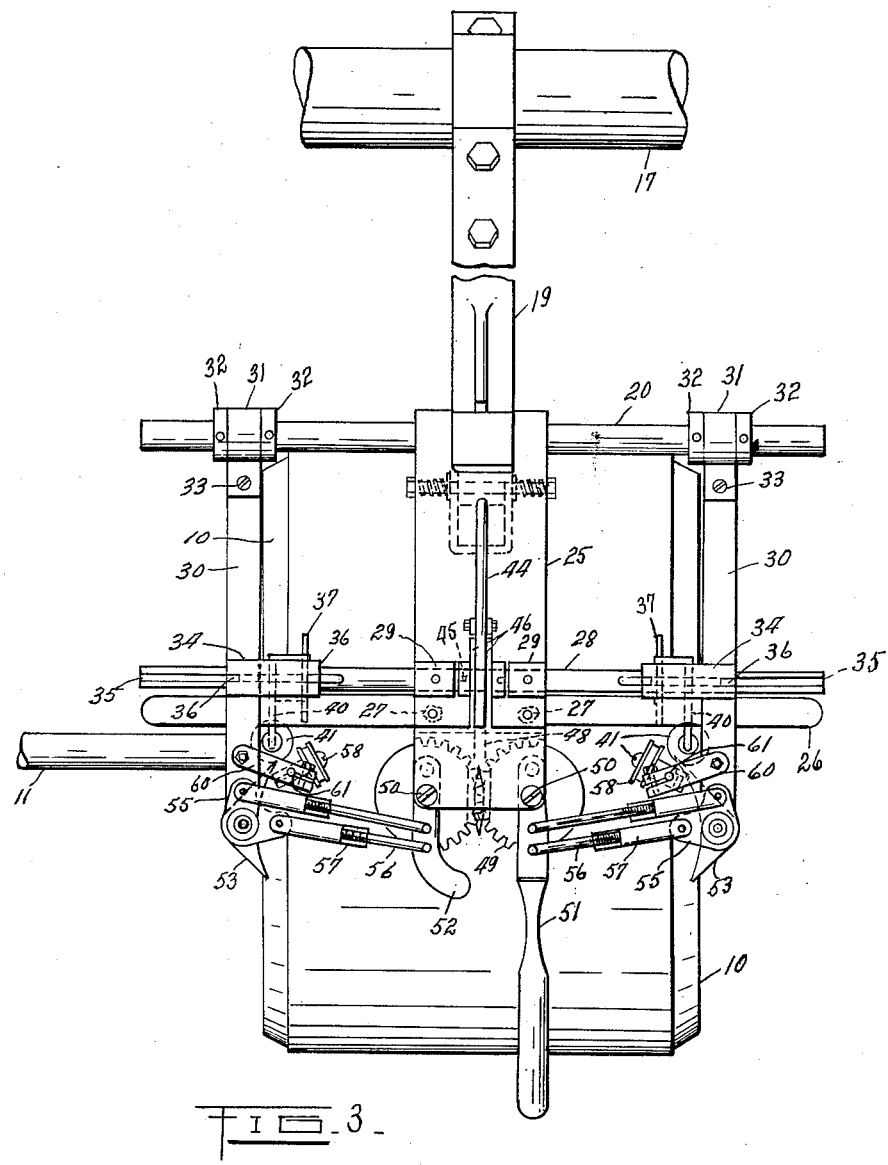

Patented Apr. 26, 1932

1,855,229

UNITED STATES PATENT OFFICE

OSCAR L. FLENER, OF AKRON, OHIO, ASSIGNOR TO THE FIRESTONE TIRE & RUBBER COMPANY, OF AKRON, OHIO, A CORPORATION OF OHIO

TIRE BUILDING MACHINE

Application filed November 9, 1929. Serial No. 405,855.

This invention relates to flat band tire building apparatus and more particularly to stitcher mechanism for bonding the various plies of the tire together with the bead properly positioned therein.

Heretofore in the construction of flat band tires certain stitching and flipping operations have been done by hand held tools. It is an object of this invention to provide simple, easily controlled and operated means for replacing all hand held tools.

Again, the invention has an object the provision of mechanism which will build tires of superior construction at a faster rate than the old hand methods.

The foregoing and other objects are accomplished by the apparatus and methods described below and illustrated in the accompanying drawings, it being understood that the invention is not limited to the specific form shown and described.

In the drawings,

Figure 1 is a side elevation of a tire building machine embodying the invention.

Figure 2 is an enlarged view of the stitcher mechanism shown in Figure 1.

Figure 3 is a plan view of the stitcher mechanism of Figure 2.

Figure 4 is an end elevation of the stitcher mechanism of Figure 2.

Figure 5 is an enlarged detail of Figure 2, showing how the stitcher bracket is connected to the connecting bar.

Figure 6 is an end elevation partly broken away and partly in section showing the flipper and one of the stitcher wheels in operation.

Figure 7 is a side elevation of the flipper.

Figure 8 is a plan view of the flipper.

Figure 9 is an end elevation showing the main stitching roller in operation.

Figure 10 is an end elevation of the chafer stitcher roll in operation.

The numeral 10 indicates a suitable collapsible flat band tire building drum carried on an axle 11 journaled in a stand 12. An electric motor 13 may be provided to drive the drum 10 through the agency of clutch means (not shown) controlled by a pedal 14. The machine is ordinarily provided with bead positioning rings, one of which is shown at 15 and with a stitcher 16 which is adapted to tilt down into contact with the tire and drum as shown in Figure 9.

The stitcher mechanism embodying the invention is pivotally mounted above the tire building drum by some means such as a stud shaft 17 which is fixedly carried in parallel relation with the axle 11 by means of a bracket 18 attached to the frame 12. An arm 19 clamped at one end to the shaft 17 supports a shaft 20 in parallel relation with the axle 11. The stitcher mechanism may thus be pivotally mounted on the shaft 20, stops 21 and 22 on the arm 19 being provided to limit the pivotal movement of the mechanism about the shaft 20.

The stitcher mechanism proper consists of a center frame 25 which is pivotally supported at its end on the shaft 20. A bar 26 is attached to the frame by bolts 27 and a shaft 28 is journaled in suitable bearings 29—29 in the frame. Connecting bars 30—30 are pivotally connected to the stationary shaft 20 through the agency of yokes 31—31. Collars 32 may be provided to properly position the yokes. The connecting bars 30—30 are also pivotally attached to the yokes 31—31 by means of the studs 33—33. The connecting bars rest on the stationary bar 26 below the shaft 28 as shown in Figures 2 and 5. Right and left-handed brackets 34—34 are splined to shaft 28 by key-ways 35—35 and keys 36. The extending legs of the brackets 34 are adapted to carry stitcher wheels 37—37. The wheels 37 are preferably journaled on studs 38, springs 39 thereon yieldingly positioning the wheels 37. Chafer stitcher arms 40 having chafer stitching rollers 41 journaled on the lower ends thereof, are also fixed to the legs of the brackets 34. The brackets 34 are adapted to be moved along the shaft 28 by means of the connecting bars 30. As shown in Figure 5 means to accomplish this include pins 42 fixed to the bars 30 which engage in slots 43 in the brackets 34. The shaft 28 is arranged to be turned to carry the stitcher wheels 37 and the chafer stitchers 41 to the inoperative dotted position shown in Figure 2. In order to turn the shaft 28 a handle 44 may be keyed thereto as at 45 (Figure 3). Rachet flanges 46 on the center frame 25 and a spring held rachet 47 may be employed to hold the shaft 28, the brackets 34 and the stitchers 37 and 41 in the desired position. It will be evident that when the bracket 34 is turned relative to the connecting bars 30, the pin 42 will slide in the slot 43 so that upon movement of the connecting bars 30 the bracket 34 will be moved along the shaft 28.

The outer end of the frame 25 is bifurcated as at 48 and a pair of mating segmental gears 49—49 are rotatably mounted therein by means of studs 50—50. A handle 51 and a stub handle 52 are fixed to the gears 49 so that any movement of the handle 51 is transmitted in equal and opposite direction to the stub handle 52.

Flippers 53 are carried on studs 54 journaled in the ends of the connecting bars 30. Fixed to the top of the studs 54 are U-shaped shifter links 55. The ends of the shifter links are pivotally linked to the handles 51 and 52 by means of rods 56 and 57 which preferably are adjustable as shown.

The connecting bars 30 also carry bead flipper stitcher wheels 58, which are journaled on stub shafts 59. Arms 60 fixed to the connecting bars carry shafts 61 which are feather keyed or formed polygonal in section at their lower ends. The stub shafts 59 are formed with transverse polygonal or splined holes to slidably receive the keyed or polygonal ends of the shafts 61. Means are provided to hold the stub shafts 59 on the shafts 61 and springs 62 permit relative sliding movement therebetween.

A centering device to assist in positioning the building material on the drum 10 includes a bifurcated lever 63 pivotally connected as at 64 to the center frame 25. Springs 65 frictionally engage the lever 63 to hold it wherever it is placed. A sharp-edged wheel 66 is rotatably mounted in the forked end of the lever 63.

The preferred manner of employing the apparatus is as follows:

The entire stitcher mechanism is tipped back against the stop 21 which being slightly behind the vertical as shown, holds the mechanism out of the way by its own weight. Several plies of fabric, generally two in number, are now run on the drum as is well known in the art.

The stitcher mechanism is dropped back down into operative position and the operator stitches the side portions of the fabric down into the bead channels by means of the stitcher wheels 37 as shown in the dotted lines in Figure 4. To do this the operator grasps the handle 51 and forces it downwardly and outwardly. The downward pressure is transmitted through the center frame 25 to the shaft 28 and the brackets 34 which carry the stitchers 37. The outward movement of the handle causes the connecting bars 30 to move outwardly which in turn causes the brackets 34, carrying the stitchers 37, to slide out on the shaft 28. The brackets 34 are connected by a pin 42 to the connecting bars 30 as described above. The springs 39 on the studs 38 yield to hold the stitchers 37 tightly against the drum.

The beads are next slammed home at the ends of the drum and with the operating handle 51 thrown to the outward position, the operator pulls the handle 44 back to the dotted line position shown in Figure 2, which raises the stitchers 37 and chafer rollers 41 out of the way, and permits the center frame to drop. The dropping of the center frame brings the flipper stitchers 58 and the flippers 53 into operative position as shown in the dotted lines of Figure 6. The operating handle 51 is moved inwardly so that the flipper stitchers 58 stitch down the bead flipper strip, the springs 62 yieldingly holding the wheels against the drum. The flippers 53 have sharp ends which are inserted between the drum and the bottom plies of fabric at approximately the angle shown in dotted lines in Figure 8. As the operating handle 51 is moved inwardly the angle the flippers make with the drum is constantly decreased, due to the rotating movement caused by the links 56 and 57 and the shifter links 55. Not only is the angle decreased, but the flippers are moved in against the bead, and as the front end of the flipper is under the bead and the rear rounded portion is over the bead, the plies of fabric are flipped up around the bead as shown in Figure 6.

The stitcher mechanism is now tipped back and the top plies, the side walls, the tread and chafer strips are applied, the centering wheel 66 being tipped down to assist in positioning them. The stitcher 16 is pulled down and bonds the various parts of the tire carcass together as shown in Figure 9. It is thereafter tipped out of the way and the stitcher mechanism is dropped back into place with the handle 44 in the full line position of Figure 2. The operating handle 51 is now moved inwardly from its outermost position, so that the chafer stitchers 41 engage the chafer strip and tuck it securely around the bead as shown in Figure 10. The stitcher mechanism is tipped back out of the way and the drum 10 collapsed to remove the completed tire.

It will be apparent that tires of different construction can be made by adjusting the length of the rods 56 and 57 either to change the angularity of the flippers 53 or their length of movement. The positions of the stitcher wheels 58 are also adjustable to take care of beads of different construction.

Various modifications of the invention can obviously be resorted to without departing from the spirit of the invention or the scope of the appended claims.

What is claimed is:

1. In tire building apparatus, a rotatable drum, a shaft fixed in parallel relation with the axis of the drum, a center frame pivotally connected to said shaft, a second shaft journaled in said frame in parallel relation with said drum axis, a pair of brackets splined to the last named shaft, a pair of stitcher wheels on each bracket, connecting bars pivotally connected to said fixed shaft and to said brackets, means for turning the second shaft to tip the brackets and the stitcher wheels to an inoperative position, additional stitcher wheels mounted on said connecting bars, flippers mounted on stub axles, journaled in the ends of the connecting bars, mating segmental gears rotatably mounted on said center frame, links connecting said gears with said stub axles so that the angular position of the flippers and the position of the connecting bars is controlled by the rotation of the gears.

2. In tire building apparatus, a rotatable drum, a frame, means for pivotally supporting said frame above said drum, a shaft journaled in said frame in parallel relation with the axis of the drum, a pair of brackets splined to the shaft, a pair of stitcher wheels on each bracket, connecting bars pivotally connecting said brackets with said frame supporting means, means for turning the shaft to tip the brackets and the stitcher wheels to an inoperative position, stub axles journaled in the ends of the connecting bars, flippers mounted on said stub axles, mating segmental gears rotatably mounted on the center frame, links connecting said gears with said stub axles, and means for rotating said gears.

3. In tire building apparatus, a rotatable drum, a frame, means for pivotally supporting said frame above said drum, a shaft journaled in said frame in parallel relation with the axis of the drum, a pair of brackets splined to the shaft, stitching means on said brackets, connecting bars pivotally connecting said brackets with said frame supporting means, means for turning the shaft to tip the brackets and the stitching means to an inoperative position, flippers pivotally mounted at the ends of said connecting bars, and means for simultaneously moving said connecting bars and turning said flippers, mating segmental gears rotatably mounted on the center frame, links connecting said gears with said stub axles, and means for rotating said gears.

4. In a tire building machine, a rotatable drum, stitcher mechanism supported in operating relation therewith, said mechanism including a shaft, opposed brackets splined on said shaft, stitching means carried by said brackets, means for turning said shaft to tip said stitching means to inoperative position, means for locking said turning means, means for sliding said brackets on said shaft, additional stitching means mounted on the bracket sliding means, and means for simultaneously moving said bracket sliding means.

5. In a tire building machine, a rotatable drum, stitcher mechanism supported in operating relation therewith, said mechanism including means for simultaneously stitching down the fabric into the bead receiving tapers, means for simultaneously stitching down the bead flipper and for flipping the bottom plies around the bead, means for stitching down the top plies, the tread and sidewall, and means for tucking the chafer strip under the bead.

6. In a tire building machine, a rotatable drum, stitcher mechanism supported in operating relation therewith, said mechanism including means for simultaneously stitching down the fabric into the bead receiving tapers, means for simultaneously stitching down the bead flipper and for flipping the bottom plies around the bead, and means for moving said first named means to inoperative position to allow said second named means to be operative.

7. In a tire building machine, a drum, stitcher mechanism pivotally supported above said drum, said mechanism including a central frame, bars pivoted at one end and lying in the plane of the frame to either side thereof, said bars being adapted to swing in the plane of the frame, stub axles journaled in the free ends of the bars, flipper plows mounted on the ends of the stub axles, U-shaped shifters mounted on the other ends of the stub axles, mating gears rotatably mounted on said central frame, and a pair of links connecting each gear to the arms of the U-shaped shifter, and means for rotating the gears.

8. In a tire building machine, a drum, stitcher mechanism pivotally supported above said drum, said mechanism including a central frame, bars pivoted at one end and lying in the plane of the frame to either side thereof, said bars being adapted to swing in the plane of the frame, flipper plows carried by said bars, and means for simultaneously moving said flipper plows toward and from the drum, and for changing their working angle with the fabric.

9. In a tire building machine, a drum, stitcher mechanism pivotally supported above said drum, said mechanism including a central frame, bars pivoted at one end and lying in the plane of the frame to either side thereof, said bars being adapted to swing in the plane of the frame, flipper plows carried by said bars, means for simultaneously moving said flipper plows toward and from the drum and for changing their working angle with the fabric, and additional stitcher means mounted on said bars.

10. In a tire building machine, a rotatable drum, and a stitcher mechanism supported in operating relation therewith, said mechanism including a flipper plow adapted to flip bottom tire plies around a tire bead, and said plow being curved for embracing the margin of said plies simultaneously about the inner and outer surfaces of said bead.

11. In a tire building machine, a rotatable drum, and a stitcher mechanism supported in operating relation therewith, said mechanism including a flipper plow adapted to flip bottom tire plies around a tire bead, said plow having a curved working edge and being mounted to embrace said bead on a secant to turn the fabric over and about the bead.

12. In a tire building machine, a drum, stitcher mechanism pivotally supported above said drum, said mechanism including a central frame, bars pivoted at one end and lying in the plane of the frame to either side thereof, said bars being adapted to swing in the plane of the frame, flipper plows carried by said bars, means for simultaneously moving said flipper plows toward and from the drum and for changing their working angle with the fabric, and additional stitcher means mounted on said bars, said stitcher means being yieldable radially of the drum to allow the flipper plows to be properly positioned.

13. In tire building apparatus, a rotatable drum, a shaft fixed in parallel relation with the axis of the drum, a center frame pivotally connected to said shaft, a second shaft journaled in said frame in parallel relation with said drum axis, a pair of brackets splined to the last named shaft, a pair of stitcher wheels on each bracket, connecting bars pivotally connected to said fixed shaft and to said brackets, and means for turning the second shaft to tip the brackets and the stitcher wheels to an inoperative position.

14. In a tire building machine, a rotatable drum, stitcher mechanism supported in operating relation therewith, said mechanism including a shaft, opposed brackets splined on said shaft, stitching means carried by said brackets, means for turning said shaft to tip said stitching means to inoperative position, and means for locking said turning means.

15. In tire building apparatus, a rotatable drum, a shaft fixed in parallel relation with the axis of the drum, a center frame pivotally connected to said shaft, a second shaft journaled in said frame in parallel relation with said drum axis, a pair of brackets splined to the last named shaft, a pair of stitcher wheels on each bracket, connecting bars pivotally connected to said fixed shaft and to said brackets, means for turning the second shaft to tip the brackets and the stitcher wheels to an inoperative position, and additional stitcher wheels mounted on said connecting bars.

16. In a tire building machine, a rotatable drum, and a stitcher having a curved working edge, said stitcher being mounted in operating relation with said drum to embrace a tire bead thereon for flipping bottom tire plies around the bead with a wiping action.

17. In a tire building machine, a rotatable tire form and a stitcher mechanism mounted for cooperation therewith, said mechanism comprising a plow pivoted to rotate in a plane at an angle to a tire bead mounted on the drum whereby one end of said plow may stitch the margin of a tire ply under said tire bead and the plow may be rotated to fold and stitch said margin around the side and outer portions of said bead.

OSCAR L. FLENER.